Feb. 8, 1966      R. F. REIFERS ETAL      3,234,077
METHOD OF FORMING A MOLDED PULP EGG CARTON
Original Filed Sept. 4, 1962                5 Sheets-Sheet 1

INVENTORS
Richard P. Reifers
Henry A. Lord
BY Karl W. Flocks
ATTORNEY

Feb. 8, 1966  R. F. REIFERS ETAL  3,234,077
METHOD OF FORMING A MOLDED PULP EGG CARTON
Original Filed Sept. 4, 1962  5 Sheets-Sheet 2
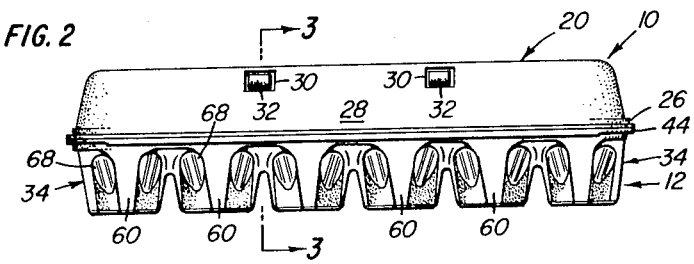
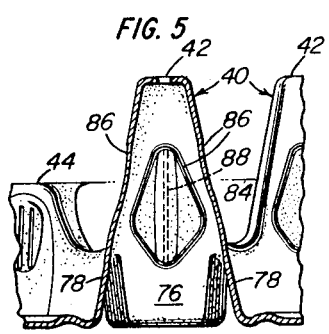
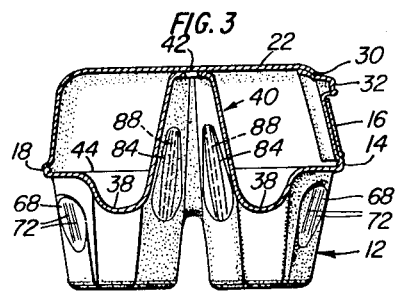
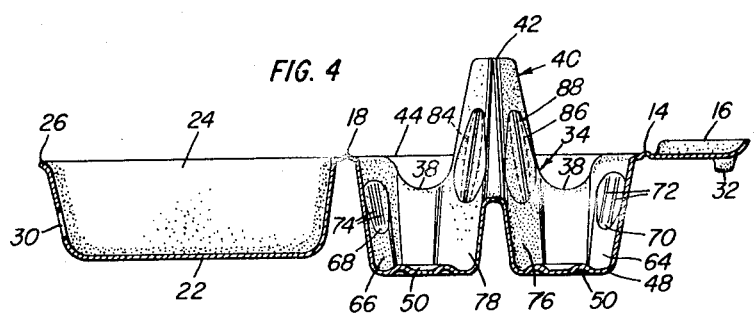
INVENTORS
Richard F. Reifers
Henry A. Lord
BY Karl W. Flocks
ATTORNEY Feb. 8, 1966  R. F. REIFERS ETAL  3,234,077
METHOD OF FORMING A MOLDED PULP EGG CARTON
Original Filed Sept. 4, 1962  5 Sheets-Sheet 5
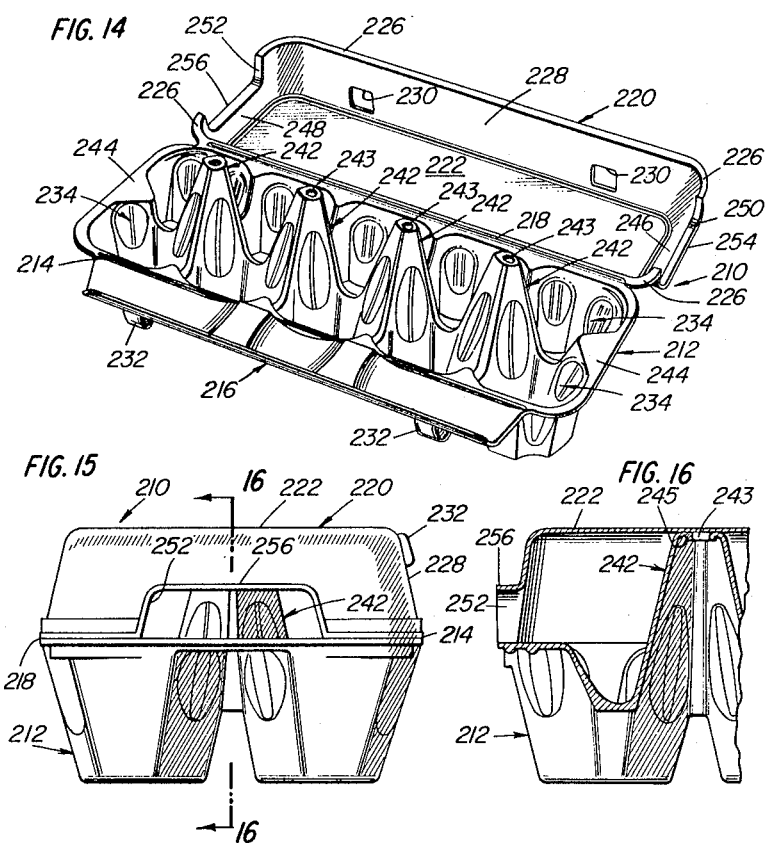
INVENTORS
Richard F. Reifers
Henry A. Lord
BY Karl W. Flocks
ATTORNEY

United States Patent Office 3,234,077
Patented Feb. 8, 1966

3,234,077
METHOD OF FORMING A MOLDED PULP EGG CARTON
Richard F. Reifers, New Canaan, Conn., and Henry A. Lord, Palmer, Mass., assignors to Diamond International Corporation, a corporation of Delaware
Original application Sept. 4, 1962, Ser. No. 221,028. Divided and this application Apr. 8, 1965, Ser. No. 456,593
4 Claims. (Cl. 162—223)

This application is a division of applicant's copending application Serial No. 221,028, filed September 4, 1962.

The present invention relates generally to molded pulp articles, and more particularly to an improved molded pulp egg carton in which selected portions of the egg cells are provided with increased strength and improved cushioning characteristics.

Eggs are widely marketed throughout the world in cartons that hold a dozen eggs each, and among the most widely known type of egg carton, is one that is produced from molded pulp. Molded pulp egg cartons are produced on pulp molding machinery in a conventional manner, wherein the carton is deposited by suction imposed within a die of desired configuration and a slurry of pulp is deposited on the exterior of the die. Thereafter, in order to enhance the appearance of the carton as well as to substantially soften the material from which the carton is produced, the article is pressed between mating dies.

In these known egg cartons, the eggs are held in egg cells, separated from each other by saddle portions between adjacent cells and vertical posts having four cells formed thereabout. The eggs are generally in contact with the walls of the cells and thus shocks to the exterior of the carton result in force being transmitted to the eggs through the walls of the carton, accordingly resulting in the small amount of egg breakage that presently exists.

Additionally, in known molded egg cartons, there is some egg movement or egg rattle, and this rattling of the eggs within the carton as they are shipped or the carton is handled, has in part contributed to egg breakage. Further, the so-called rattling of the eggs has resulted in a deleterious effect on the quality of the eggs.

Further, in prior art egg cartons, it has been the general practice of packaging eggs of a given size or quality together in one carton, and in order to provide the best possible marketing of eggs, consistent with necessary economies, it has been the general practice to provide different sizes of cartons for some of the different grade of eggs. Despite the care that has been taken in sorting the eggs, unless the selection is carried to a degree far beyond that which is economically feasible, a dozen eggs of a particular grade, as far as marketing standards are concerned, will nevertheless vary, one from another, over a certain range of exterior dimensions as well as weight. Thus, as a result of the variations of individual egg grades and weights, it has been found that those eggs, which depart from the standard of a particular grade, will not be securely and properly retained in an egg cell.

Although molded pulp egg cartons may be produced to accommodate all sizes of eggs, however, to store and tool up to produce the range of sizes of egg cartons necessary to accommodate all the single variations is neither practical or economical. Additionally, the shipping cartons in which egg cartons are shipped and stored generally have uniform exterior dimensions, and therefore there has been a constant attempt to maintain exterior dimensions of the egg cartons relatively uniform. Further, there has been a constant research to develop a substantially universal carton which will accommodate and protect substantially all ranges of sizes of eggs without materially changing exterior dimensions of the carton, and it is toward this end which the novel carton and method of the present invention is directed.

The primary object of the present invention is to provide a novel method for producing a substantially universal molded pulp article packaging element in which article movement and rattle are substantially reduced, to accommodate for varying dimensions of articles and reduce accidental breakage to a minimum.

A further object of the present invention is to provide a method for producing an egg packing element or an egg carton which includes features which permit ready denesting or separation of a stack of egg cartons, one from the other.

A still further object of the present invention is to provide a method for producing a molded pulp egg carton in which both large and small dimensioned eggs will be adequately supported, and the eggs will be supported in a relatively soft support surface on support structure to retain them in a relatively protected and fixed position within an egg cell and both relatively large and small sized eggs can be readily accommodated in the same carton.

Still another object of the invention is to provide a method for producing a molded pulp egg carton which includes a cell structure having relatively rigid and reinforced outer walls to protect against external shock, and a relatively soft and resilient inner support surface for readily absorbing shock transmitted to the eggs from the outer wall.

And yet another object of the present invention is to utilize a novel reforming method for molded pulp egg cell support structure whereby the nature of the egg support surface, due to the fiber character of the material used to produce the carton, is such that certain fiber portions are substantially softened and reoriented to a degree to afford in a sense mechanical movement between integral and reoriented fiber.

And a still further object of the present invention is a method to provide, in a novel egg cell structure for molded pulp carton portions, substantially tangential contact with eggs in the cell so that there is a minimum of sticking of the eggs in a cell due to "leakers" or broken eggs whereby eggs may be readily removed from the cells.

And yet another object of the present invention is a method to provide a novel cell structure in molded pulp egg packing elements of a capacity different from the conventional one-dozen egg capacity.

Other objects and the nature and advantages of the instant invention will be apparent from the following description taken in conjunction with the accompanying drawings, wherein:

FIG. 2 is a front elevation of the carton of FIG. 1, on a reduced scale, showing the carton is a closed condition;

FIG. 3 is a vertical section taken substantially on the plane of line 3—3 of FIG. 2;

FIG. 4 is a vertical section taken substantially on the plane of line 4—4 of FIG. 1;

FIG. 5 is a fragmentary vertical section taken substantially on the plane of line 5—5 of FIG. 1;

Figure 7:
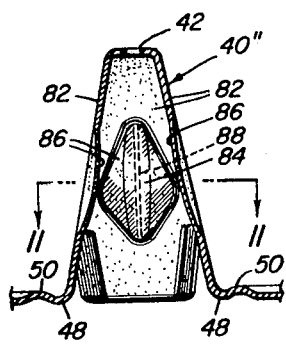
FIG. 7 is a vertical section similar to FIGS. 5 and 6, showing the appearance of a separator post cushioning area during initial pressing.
Figure 8:
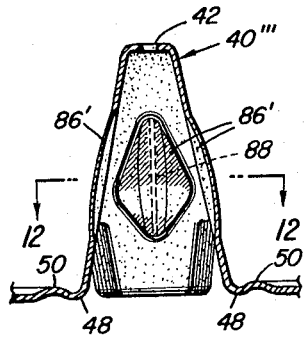
FIG. 8 is a vertical section similar to FIGS. 5–7, showing the appearance of the cushioning area of a vertical separator post after reforming or secondary pressing thereof.
Figure 9:
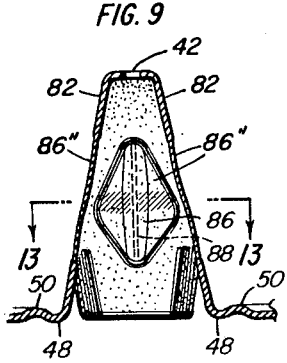
FIG. 9 is a vertical section similar to FIGS. 5–8, showing the residual position of the vertical separator post cushioning areas.
Figure 11:
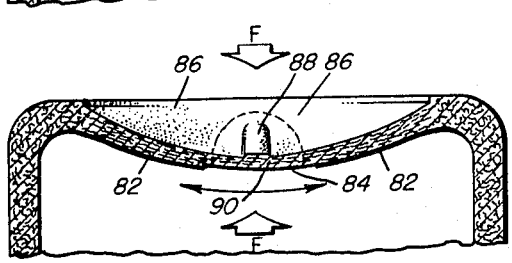
Figure 12:
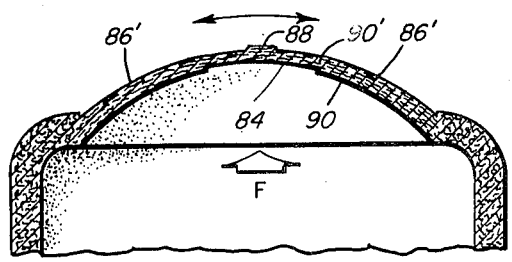
Figure 13:
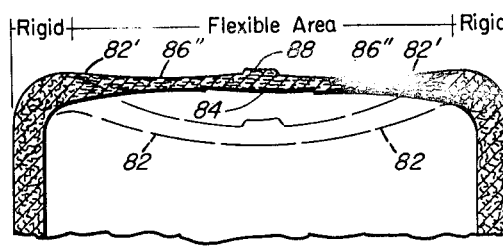

FIG. 11 is an enlarged horizontal section taken substantially on the plane of lines 11—11 of FIG. 7, showing the initial forming step which generally is accompanied by considerable pressure and heat applied between mating pressing dies, and illustrating the manner in which the fibers at the cushioning area are reoriented, the inner surface fibers being subject to greater tension than those in the outer surface of the cushioning area;

FIG. 12 is an enlarged horizontal section taken substantially on the plane of line 12—12 of FIG. 8, showing the manner in which the cushioning area is reformed between mating dies to subject the outer surface fibers to greater tension than those on the inner surface as mentioned with respect to FIG. 11;

FIG. 13 is an enlarged horizontal section taken substantially on the plane of line 13—13 of FIG. 9, illustrating the manner in which the cushioning area tends to assume a substantially planar condition due to the "memory" effect caused by the step of FIG. 11, shown by phantom lines, the cushioning area comprising "super soft" fibers on both the inner and outer surfaces of the cushioning area;

FIG. 14 is a perspective view of another embodiment of the novel carton in an open condition, incorporating the novel cells and including a modified lid end wall in conjunction with a slightly modified support post top wall;

FIG. 15 is an end view of the carton of FIG. 14 when closed, looking from left to right at FIG. 14; and FIG. 16 is a fragmentary vertical section taken substantially on the plane of line 16—16 of FIG. 15.

Referring to the drawings in detail, a molded pulp egg carton is indicated generally at 10 and comprises a lower bottom or egg receiving section 12, to which is hingedly connected at 14 a lock flap 16. Hingedly connected opposite the lock flap 16 as indicated at 18 is a substantially planar lid or cover member 20.

The cover member 20 includes a substantially planar top 22 integral with an outwardly angled or diverging peripheral side wall 24 which terminates in a peripheral lower bead 26. The front or forward wall 28 of the peripheral wall 24 has extending therethrough longitudinally spaced apertures or slots 30 for receiving therethrough locking buttons 32 projecting forwardly from the lock flap 16, the rear appearance of these lock buttons being shown in FIG. 1.

The lower or egg receiving section 12 of the carton includes a plurality of substantially similar, egg receiving cells indicated generally at 34, each of the cells being separated one from the other by means of longitudinally and transversely extending saddle portions 36 and 38, respectively. Intersecting pairs of the saddle portions 36, 38 substantially define edge portions of frusto-pyramidal separator posts indicated generally at 40 which terminate in a substantially square top portion 42, the corners of which are disposed in alignment with the saddle portions 36 and 38. The upper portions 42 of the separator posts 40, as seen in FIG. 3, will abuttingly engage the inner surface of the planar top 22 of the cover member 20 for absorbing force on the cover member and transmitting it through the post to the bottom portions of the cells without injury to the eggs contained therein.

Figure 1:
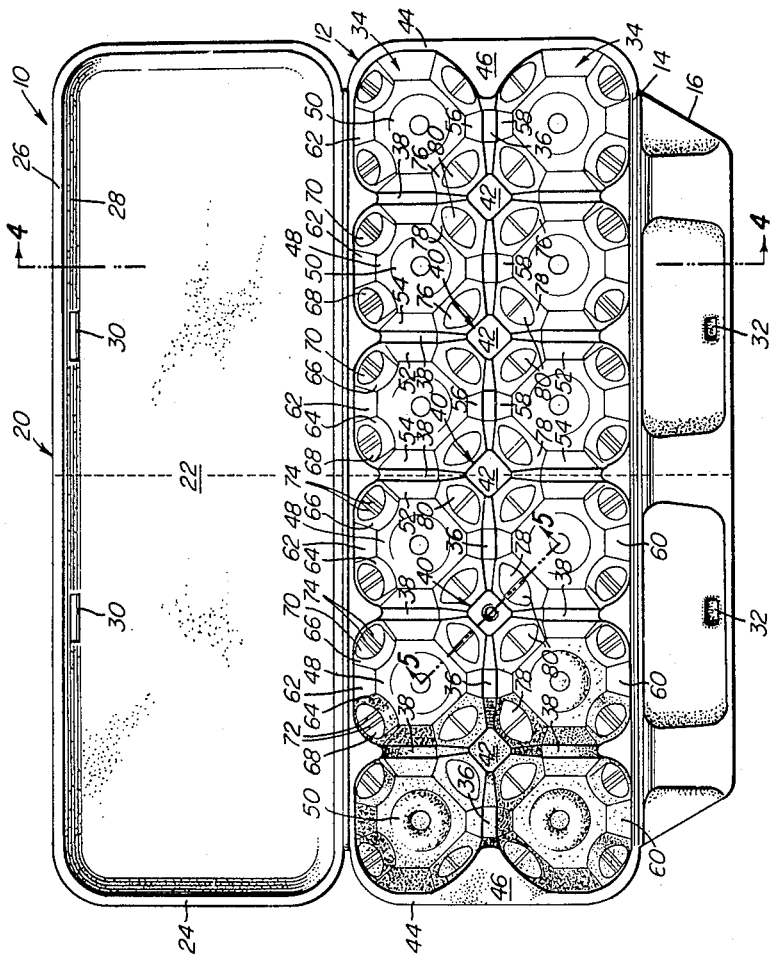
FIG. 1 is a top plan view of a molded pulp egg carton, incorporating the novel features of the invention.

The egg receiving section 12 includes a peripheral marginal edge portion 44, portions of which engage the peripheral bead 26 of the cover member when the carton is closed in the manner shown in FIG. 2. The posts are eliminated at portions 46 at the opposite ends of the carton; however, the egg supporting structure in the endmost cells functions in substantially the same manner as that of the innermost cells. Each of the cells 34 comprises a transverse bottom 48 preferably including a cushioning button 50. The cells, when viewing the interior thereof, as seen in FIG. 1, are formed with upwardly and outwardly integrally connected adjacent cell forming sections, or segments 52 and 54, which converge upwardly and terminate at the upper surface of the saddle 38. Adjacent segments 56 and 58 converge upwardly and terminate at the longitudinally extending saddles 36. Segments 60 extend outwardly and terminate at the hinge line 14 and constitute a portion of the forward wall of the egg receiving section of the carton, and segments 62 extend upwardly and outwardly and form a portion of the rear wall of the egg receiving section.

The segments 52, 54, 56 and 62 are generally not engaged by an egg disposed in the cells unless the eggs are particularly large or of a "golf-ball" shape, for example. Each of the cells affords a substantial four-point support for the eggs disposed therein. This four-point suspension of the eggs is afforded by a pair of similar cell forming segments 64 and 66 which have a lower portion having a convex cross section, when viewing the interior of the cells, this convex cross section merging into vertically extending and elliptical or tear-shaped pressed areas 68 and 70, respectively. If preferred, the elliptically shaped sections 68 and 70 may have vertically extending therein inwardly pressed rib portions 72 and 74 respectively, which in effect reduce the surface exposure to the eggs in the cells to prevent sticking of eggs in the case of a "leaker," for example.

The segments 62, 64 and 66 provide a relatively rigid wall in the cells, however, the pressed areas 68 and 70 are relatively "soft" and together with the ribs 72 provide a minimum of egg contact. The convex surface may have an arc which is shallower than that found in most eggs, and thus minimum egg contact is insured. This relatively rigid outer wall construction for the cells affords protection of the eggs due to lateral shock occurring during handling, packing and shipping.

The frustro-pyramidal separator posts 40 include substantially planar post forming segments 76 and 78 in the respective cells 34, and four adjacent cells including opposed pairs of segments 76 and 78, as clearly seen in FIG. 1, which together with the top portion 42 form one of the frustro-pyramidal separator posts. It will be noted that the opposed pairs of post forming segments 76 and 78 converge into the substantially rectangular or square upper end portion 42 of the separator post. The cell segments 62 extend in planar relation down to the cell bottoms and are disposed at a greater angle with respect to the vertical than the adjacent convex segments 64 and 66. Stated in another way, the segments 64 and 66 are more vertically disposed than the segments 62. The pressed areas 68 and 70 are formed above the base of the cells and extend upwardly and outwardly at a still greater angle.

The cushioning areas or "bubble indents" 80 are formed above the base of the cells and are arcuate along their length, first curving inwardly a greater degree than the shallow return curve as seen in FIG. 7. The shallow return curve aids to control egg rattle in the upper zone of the egg cells.

The adjacent cell walls 76 and 78 are set off from each other at approximately 45 degrees with respect to a vertical plane passing through the saddle 36 therebetween, and the flutes or areas 68 and 70 are at approximately 32 degrees with respect to this vertical plane.

This arrangement provides maximum base footing for the carton when closed to transmit vertical loads on the closed carton. Further, good nesting is obtained with this arrangement. All of the egg bearing surfaces 64, 66, 76 and 78 of a cell extend upwardly and outwardly from the cell base at substantially 12½ degrees at a lesser angle than adjacent non-egg bearing segments. The cushioning areas 68 and 70 extend at an angle of substantially 21 degrees, and the egg cushioning areas 80 on the up posts comprise a compound arc along their length for controlling egg rattle as mentioned above.

Each of the separator post segments 76, 78 has formed therein vertically extending and substantially elliptically shaped egg contact or cushioning areas, the major axis of which extends above and below the upper edge margin 44 of the egg receiving section 12. The egg contact areas include therein a vertically extending and substantially thin strip of natural random formation fiber extending substantially the length thereof, and surrounded by a relatively thicker section of reoriented fiber bordered by still thicker sections of reoriented fiber reinforcing the corners of the separator posts. The structure will be described in detail with respect to FIGS. 6-13.

Figure 6:
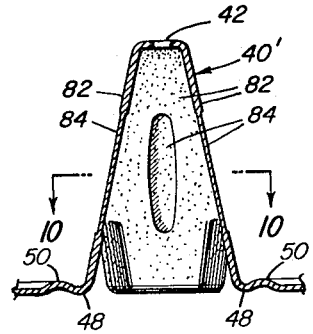
FIG. 6 is a vertical section similar to FIG. 5, showing the appearance of a separator post after initial disposition of a pulp slurry on a suction mold die, and prior to pressing of the same.
Figure 10:
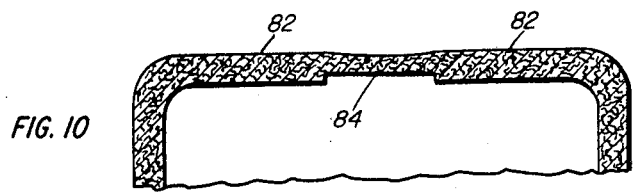
FIG. 10 is an enlarged fragmentary horizontal section taken substantially on the plane of line 10—10 of FIG. 6, showing a cross section through one vertical post cushioning area after original molding or disposition of the pulp slurry on a suction mold forming die; and illustrating diagrammatically the random or normal orientation of the article fibers.

Considering FIG. 6, a typical separator post is indicated at 40', this constituting substantially the configuration of the posts when they are initially deposited on a suction mold. Further, considering one of the wall portions 82, also see FIG. 10, there is formed in these wall portions by means of a suitably conformed blanking element on the suction die, an elongated, relatively thin strip 84 of natural random formation fiber visible when looking into the posts; see FIG. 6.

After the initially molded carton or preform is removed from the suction die screen, it is pressed between a pair of cooperating male and female dies into the condition shown in FIG. 7. The separator post indicated at 40", FIG. 7, and the wall 82 thereof is subjected to considerable pressures and/or heat which reorients the fibers into substantially parallel planes, this resulting in a softening of the separator post. The pressing dies are suitably formed to provide cushioning areas 86 extending around the fiber strips 84. Still further the pressing dies will form on the outer surface of the normally oriented fibers elongated ribs 88 which will provide substantially tangential contact with the outer surface of eggs supported in a cell.

The forming step illustrated in FIGS. 7 and 11 is for the purpose of not only softening the cushioning area 86, but also imposing in the separator post wall 82 an indented portion to normally accommodate the largest size egg of a particular range that will be packed in the cartons. The excessive curvature results in the fibers of the inner surface of the wall 82 as indicated at 90, being subject to tension or in a sense "pulled apart."

Considering FIG. 8, the separator post is indicated at 42''' and the cushioning area fiber 86' is reversely oriented in the direction opposite that shown in FIG. 11, see FIG. 12. The reverse pressing of reorientation that occurs due to suitably conformed dies to obtain the construction shown in FIG. 8, results in an outward bowing of the cushioning area now indicated at 86', and the cushioning area fiber indicated at 90 is subject to a compression which tends to cause the fiber in this inner surface area to move together or slide with respect to adjacent fiber, and the fiber at the outer surface of the cushioning areas as indicated at 90' is now subject to tension similar to that described with respect to the portion at 90. The reverse reorientation results in the cushioning area assuming a substantially planar condition as indicated at 82" in FIGS. 9 and 13, the separator post walls 82 assuming this condition due to a substantial "memory" effect due to the configuration initially produced in the steps shown in FIG. 7 and FIG. 11. The cushioning area 86" of the separator post walls will have been "super softened" wherein the fibers on the outer and inner surface will be in effect in interdigitated relationship to permit ready inward or outward movement. The planar condition of the post walls facilitates denesting.

Additionally, during the multiple pressing steps mentioned above, the corners of the separator post will receive the excessive material therein and become relatively rigid or thickened to substantially rigidify the post for the purpose of transmitting vertical force on the carton lid. The ribs 88 of the separator post side walls will have substantially tangential contact with eggs supported in the cells, and lateral blows to the carton will be readily absorbed by the super softened cushioning areas 86" when the separator post walls are disposed in the planar relationship as indicated at 82', in FIG. 13, or medium or large size eggs will be accommodated in the cells. However, in the event a packer decides to pack extra large or jumbo size eggs in the cell, this is readily permitted since the cell walls which have been super softened, and the cushioning areas 82 may be displaced inwardly to the position shown by the dotted lines in FIG. 13.

Referring to FIGS. 14-16, a further embodiment of an egg carton is indicated generally at 210, this carton including, as indicated by general reference characters, a lower bottom or egg receiving section 212 hingedly connected at 214 to a lock flap 216. Hingedly connected to the bottom section 212, opposite the lock flap 216 as indicated at 218 is a substantially planar lid or cover member 220.

The bottom section 212 includes a plurality of cells 234 formed by vertically extending posts 242; it being noted in this embodiment that ten egg cells are joined in the bottom section. The nature of the cells 234 and posts 42 is substantially identical in structure and function with the similar parts of the previously described embodiment and thus further description of the similar portions appears to be unnecessary.

When the posts 242 as well as previously described posts 42 are initially formed, they may have a transverse aperture 243 therein which will have an annular rib 245 thereabouts; see FIG. 16, within the post, after the posts are reformed as previously described.

The bottom section 212 includes peripheral, marginal flange portions 244 which extend into the hinges 214 and 218. The lock flap 216 includes forwardly projecting lock buttons 232 which will cooperate with apertures 230 in the forward wall 228 of the lid 220.

The lid 220 includes a substantially planar top 222 which will abuttingly engage the upper surface of the posts 242, and includes marginal flange portions 226 which will seat on the marginal flange portions 244 of the bottom section 212.

The lid also includes diverging end walls 246 and 248 including upwardly extending notched-out portions 250 and 252, respectively, which are bordered by outwardly projecting U-shaped flange portions 254 and 256, respectively. These notched-out portions, as clearly seen in FIG. 15, provide a through passage within the closed cartons to facilitate air movement for ventilation and refrigeration, i.e., maintain uniform temperatures at storage and distributing facilities. The flanges 254 and 256 reinforce the openings 250 and 252 for maintaining structural strength during vertical loading and shocks to the closed cartons. The apertures 250, 252 afford a saving in the amount of pulp used in carton production, and afford the consumer means to examine the carton contents.

Thus there has been provided a substantially universal separator post construction which will accommodate an unusually large range of egg sizes. Not only does this eliminate the necessity for producing a plurality of different ranges of sizes of egg cartons, but it also eliminates the excessive stock a packer must normally carry in his egg packing room, and further the eggs are protected and cushioned against breakage and damage during handling. The "memory" position of the separator post walls facilitates denesting.

Briefly in review, the segments 62, 64, 66 of the cells 34 provide relatively rigid stable outer wall construction, and the cushioning areas of the separator post walls provide an unexpected versatility in a single carton due to the utilization of the "memory after-forming" phenomena incorporated in forming and then reforming the separator post. The rigid outer walls in the cells protect the eggs against lateral shock, and the cushioning areas absorb the shock that is transmitted to the eggs. The cushioning areas may be displaced for different size eggs and tend to stabilize the eggs against rattling within the cells. It will be noted that the elliptically shaped cushioning areas of the cell walls extend above and below the upper margin of the cell forming portions of the carton.

Still further, the novel cells may be utilized in cartons of different capacities, and the lid may include ventilation examination apertures without loss of structural strength.

Although the egg cartons are disclosed as being constructed from pulp fiber, the use of other materials such as plastic, for example, is contemplated as being within the scope of the invention.

Additionally, it is to be understood that the post wall of FIGS. 7 and 11 could be used without the after-forming steps disclosed in FIGS. 8 and 12 to ultimately provide the post of FIGS. 9 and 13.

It will be obvious to those skilled in the art that various changes may be made without departing from the scope of the invention, and therefore the invention is not limited to what is shown in the drawings and described in the specification but only as indicated in the appended claims.

What is claimed is:

1. The method of producing a molded pulp egg packing element comprising the steps of: suction molding a pulp preform including separator posts having a thin strip of natural random formation fiber; reforming said separator posts and forming an area surrounding said thin strip of fiber which comprises reoriented fiber and in which one surface of the preform is subject to tension; and reforming said separator posts and reforming said area surrounding said thin strip of fiber to subject the tensioned surface to compression and an opposite surface to tension whereby the cushioning area assumes a super soft, substantially planar attitude.

2. The method of claim 1, including the step of forming a vertical egg contact rib on said normally oriented thin strip for substantially tangential contact with eggs.

3. In the method of producing molded pulp articles comprising the steps of
   (A) suction depositing a pulp preform on a mold and forming a separator post surrounded by a plurality of cells with a thin vertical strip of natural random fiber on said post and disposed in each of said cells;
   (B) pressing and reforming said post and forming a closed geometric area about said thin strips of natural random fiber and reorienting the fibers in said closed geometric area by pressing said closed geometric area inwardly away from said cells; and
   (C) pressing and reforming said post and said closed geometric areas in a reverse direction by pressing the area into said cells whereby said closed geometric areas attain a substantially planar attitude.

4. The method of claim 3 including the step of forming a vertical rib on said thin strip of natural random fiber when pressing and reforming the closed geometric area when pressing it inwardly, away from said cells.

References Cited by the Examiner

UNITED STATES PATENTS

| | | | |
|---|---|---|---|
| 2,600,130 | 6/1952 | Schilling | 229—29 |
| 3,016,176 | 1/1962 | Reifers et al. | 217—26.5 |
| 3,185,370 | 5/1965 | Reifers et al. | 229—2.5 |

DONALL H. SYLVESTER, *Primary Examiner.*

J. H. NEWSOME, *Examiner.*